United States Patent [19]  [11] Patent Number: 4,940,879
De-Swaan  [45] Date of Patent: Jul. 10, 1990

[54] CUTTING HEAD FOR USE IN A NON-CONTACT CUTTING PROCESS

[75] Inventor: Avner De-Swaan, Ramat Hasharon, Israel

[73] Assignee: F.I.A. Futurologie Industrielle Automation GmbH, Frankfurt am Main, Fed. Rep. of Germany

[21] Appl. No.: 419,816

[22] Filed: Oct. 11, 1989

[51] Int. Cl.$^5$ .................................... B23K 26/00
[52] U.S. Cl. ....................... 219/121.67; 219/121.72; 219/121.58; 219/121.39; 269/8
[58] Field of Search ............ 219/121.67, 121.72, 219/121.6, 212.85, 121.58, 121.48, 121.36, 121.59, 121.39, 121.44; 269/8; 266/48, 68, 70

[56] References Cited

U.S. PATENT DOCUMENTS

| | | | |
|---|---|---|---|
| 3,701,881 | 10/1972 | Rother et al. | 219/121.46 X |
| 4,021,025 | 5/1977 | Frame | 266/70 |
| 4,101,754 | 7/1978 | Fischer | 219/121.39 X |
| 4,618,758 | 10/1986 | Gilli et al. | 219/121,67 |

*Primary Examiner*—C. L. Albritton
*Attorney, Agent, or Firm*—Seidel, Gonda, Lavorgna & Monaco

[57] ABSTRACT

A cutting head for use in a non-contact process of cutting a work piece that is attractable by a magnetic force, the cutting head including a cutting tip, apparatus for sensing proximity of a work piece to the cutting tip, and selectable operable magnetic apparatus for attracting a slug formed from the work piece, the magnetic apparatus being arranged within the cutting head so as not to interfere with the operation of the apparatus for sensing.

23 Claims, 4 Drawing Sheets

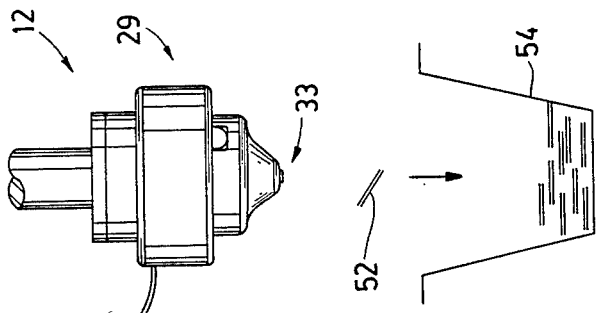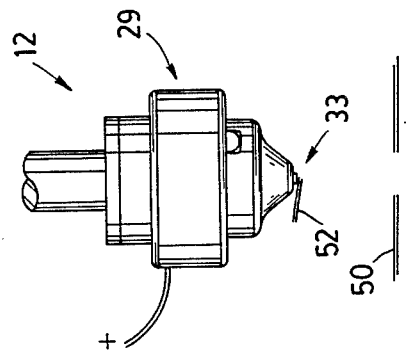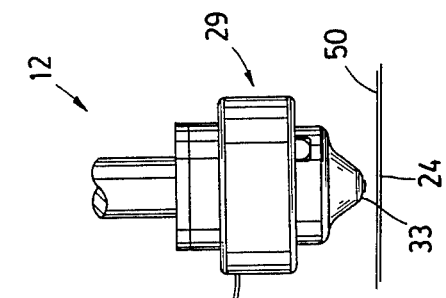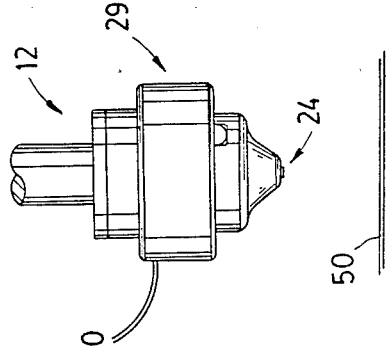

CUTTING HEAD FOR USE IN A NON-CONTACT CUTTING PROCESS

FIELD OF THE INVENTION

The present invention relates, in general, to non-contact cutting apparatus and, in particular, to non-contact cutting apparatus which includes apparatus for removing slugs resulting from cutting.

BACKGROUND OF THE INVENTION

There are known various types of non-contact cutting apparatus for cutting sheet metal work pieces. When, for example, a laser cutter is used to make holes in a work piece, by cutting along a closed or continuous path, cutouts or slugs result. In certain cases, such as, when the work piece is a partially assembled product, it may be required that the slugs be collected and not permitted to fall into the work area.

A particular situation when the work piece is a partially assembled product is when the work piece is a car body. Once the body only has been assembled, (a situation known in the car industry as 'body in white'). apertures are formed in it so as to permit assembly of various fixtures. It will be appreciated that it is most undesirable for the slugs resulting from the apertures formed in the car body to fall inside it. Manual removal of these slugs is, however, time-consuming and adds, therefore, to the production cost of cars.

A cutting head employing a permanent magnet and a selectably operable system high pressure air jets is known, wherein a slug, formed as described above, is attracted to the magnet so as to become retained thereby. Once the cutting head has been moved to a predetermined location, the air jets are operated so as to overcome the retentive force of the magnet, causing separation of the slug therefrom and removal of the slug from the cutting head.

This system of air jets, however, has been found not to be entirely reliable, as it does not always remove the slugs from the cutting head, and slugs, therefore, may remain attached to the permanent magnet so as to interfere with subsequent cutting operations.

SUMMARY OF THE INVENTION

The present invention seeks to provide an improved non-contact cutting head for metal work pieces, so as to overcome disadvantages of known art.

The present invention also seeks to provide a method of non-contact cutting of metal work pieces, employing the improved cutting head of the invention.

There is thus provided, in accordance with a preferred embodiment of the invention, a cutting head for use in a non-contact process of cutting a work piece that is attractable by a magnetic force, the cutting head including a cutting tip, apparatus for sensing proximity of a work piece to the cutting tip, and selectably operable magnetic apparatus for attracting a slug formed from the work piece, the magnetic apparatus being arranged within the cutting head so as not to interfere with the operation of the apparatus for sensing.

Additionally in accordance with an embodiment of the invention, the selectably operable magnetic apparatus includes a magnetizable portion arranged adjacent to the cutting tip, and selectably operable electromagnetic apparatus operative to magnetize the magnetizable portion and being arranged within the cutting head so as not to interfere with the operation of the apparatus for sensing.

Further in accordance with an embodiment of the invention, the apparatus for sensing is arranged adjacent to the cutting tip and the magnetizable portion is arranged so as to partially enclose the cutting tip and the apparatus for sensing so as to define a magnetizable tip adjacent to the cutting tip, the electromagnetic apparatus including a coil arranged so as not to substantially surround the apparatus for sensing.

Additionally in accordance with an embodiment of the invention, the apparatus for sensing is a capacitance sensor.

There is also provided, in accordance with an additional embodiment of the invention, non-contact cutting apparatus for use in a non-contact process of cutting a work piece that is attractable by a magnetic force, the non-contact cutting apparatus including a cutting head which includes a cutting tip, apparatus for sensing proximity of a work piece to the cutting tip, and selectably operable magnetic apparatus for attracting a slug formed from the work piece, the magnetic apparatus being arranged within the cutting head so as not to interfere with the operation of the apparatus for sensing.

According to yet a further embodiment of the invention, there is provided a non-contact cutting method including the steps of moving a non-contact cutting head towards a work piece that is attractable by a magnetic force; sensing the proximity of the work piece to the cutting head; directing, via the cutting head, a beam of energy at the work piece so as to cut through the work piece so as to form an aperture therein and thereby form a slug; generating a magnetic field in the vicinity of the cutting head so as to attract the slug thereto; moving the cutting head to a slug release location; and removing the magnetic field so as to release the slug from the cutting head.

BRIEF DESCRIPTION OF THE DRAWINGS

The present invention will be more fully understood and appreciated from the following detailed description, taken in conjunction with the drawings, in which:

FIGS. 3A–3D are diagrams showing the various stages in a non-contact cutting method, including removal of the resulting slugs, according to yet a further embodiment of the embodiment.

DETAILED DESCRIPTION OF THE INVENTION

Figure 1A:
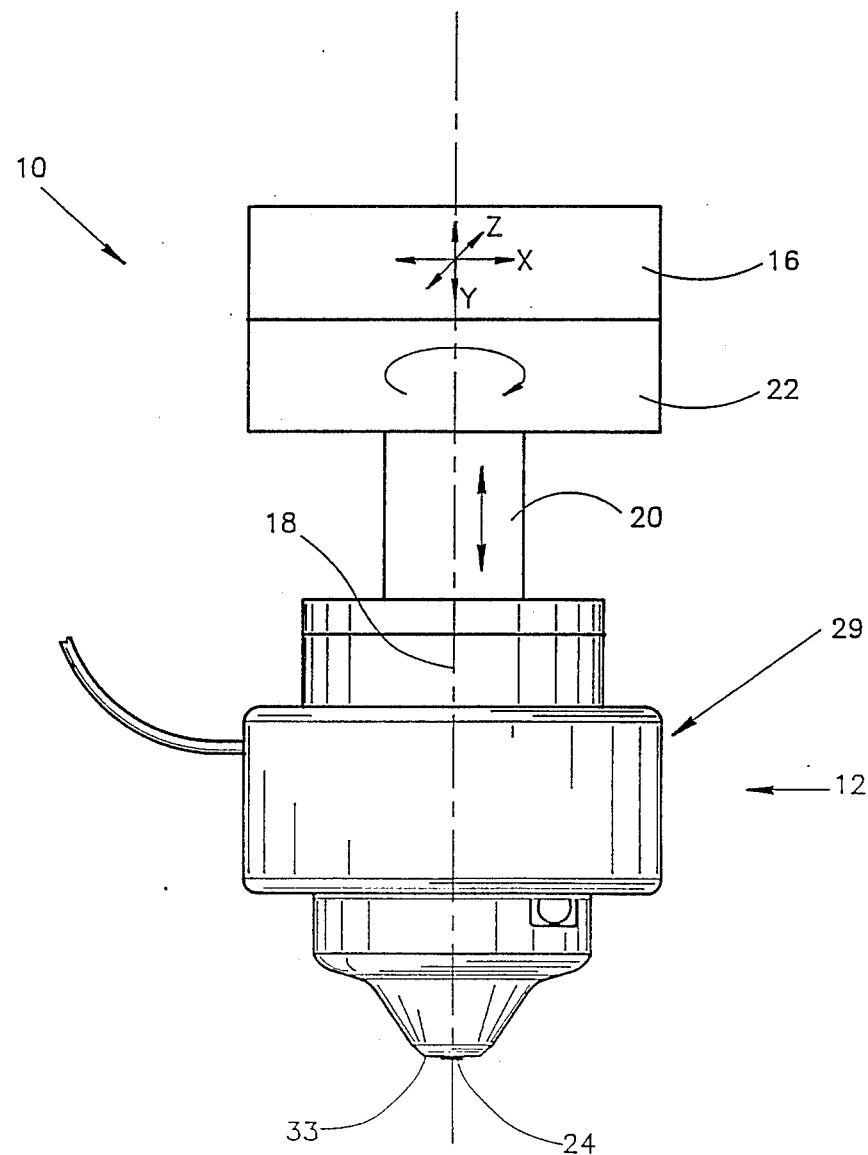
FIG. 1A is a side view illustration of a non-contact cutting head constructed and operative according to a preferred embodiment of the invention.

Reference is now made to FIG. 1A, in which there is shown non-contact cutting apparatus, referenced generally 10, which includes a cutting head 12, constructed and operative according to a preferred embodiment of the invention. According to the present embodiment, cutting apparatus 10 employs a laser, shown schematically at block 14, and includes apparatus for moving the cutting head along X and Y axes, as shown schematically at block 16, and apparatus for moving the cutting head along its axis of symmetry 18, as shown schematically at block 20.

The cutting apparatus also includes apparatus (not shown) having further degrees of freedom of movement, so as to be able to position the cutting head as required at any orientation in space. typically at right angles with respect to a work piece. The cutting head may also be moved along a selected path within a plane parallel to a cutting plane, as shown schematically at block 22, so as to cut a predetermined shape in a work piece, thereby forming a slug, as known in the art.

Typical non-contact laser cutting systems are the TFS and Modulaser systems, both of which are manufactured by Robomatix International Inc., 39750 Grand River Avenue, Suite A3, Novi, Mich. 48050, U.S.A..

Figure 1B:
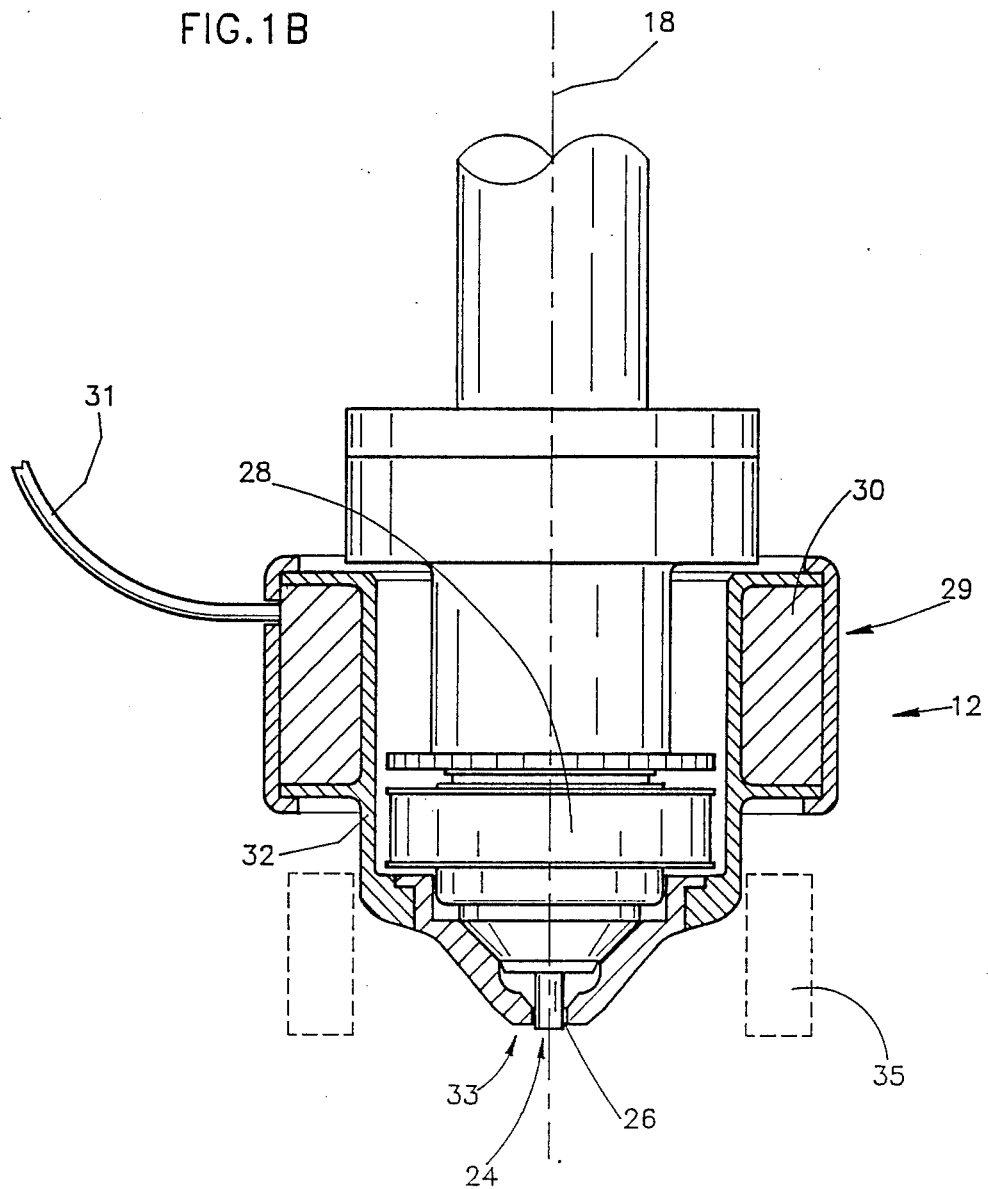
FIG. 1B is a partially cut-away side view illustration of the cutting head shown in FIG. 1A.

With reference now also to FIG. 1B, cutting head 12 defines a cutting tip 24 defining an aperture 26, permitting passage of a beam of laser energy therethrough. A proximity sensor 28, is also provided, as known in the art, and, typically, is a capacitance proximity sensor, such as manufactured under the trademark Lasermatic, by Weidmuller, of Werk Baden-Baden, Werkstrasse 17, Baden-Baden 24. West Germany. The function of the proximity sensor is to maintain a predetermined spacing between the cutting tip 24 and a work piece, as described hereinbelow in conjunction with the method of FIG. 3.

The cutting head also includes electromagnetic apparatus, referenced generally 29, for permitting removal of a slug from the work area. The magnetic apparatus is an electromagnet, having a coil 30 (FIG. 1B), to which current is supplied via a wire 31. The coil 30 is arranged about axis 18 and housed within a magnetizable element 32 which, as shown, encloses the coil, the proximity sensor and side portions of the cutting tip, so as to define a magnetic tip 33 arranged substantially concentrically with the cutting tip.

Although element 32 is shown to be made of a number of discrete portions fitted together, this is for example only, and the precise number of portions and their particular configuration may be other than that exemplified in the drawings.

It has been found by the Applicant that, if the coil 30 is arranged so as to substantially surround the proximity sensor 29, in a position such as shown by broken lines 35 in FIG. 1B, the operation of the proximity sensor is affected so as to render the cutting apparatus substantially inoperable.

It is thus a particular feature of the present invention that, the coil 30 does not substantially surround the proximity sensor so as to interfere with its operation.

As will be appreciated by persons skilled in the art, while element 32 is required to be magnetizable, so as to be able to attract slugs formed by cutting along a closed path, it is also necessary that it have no substantial residual magnetism when the current to the coil is terminated, thereby permitting the slug to fall. This feature is essential if it is sought to provide a non-contact cutting system characterized by slug removal that is reliable. Accordingly, element 32 is formed of a ferromagnetic material, generally having a low carbon content, preferably of not more than 0.1%.

According to the shown embodiment, a cover member 37, made of a non-magnetic material, such as aluminum, is mounted onto the tip 33 of element 32. This cover member is provided so as to further ensure that, any residual magnetism that may remain in the element 32, notwithstanding its preferably low carbon content, will not be sufficient to prevent a slug from falling from the cutting head when the current is switched off.

Figure 2:
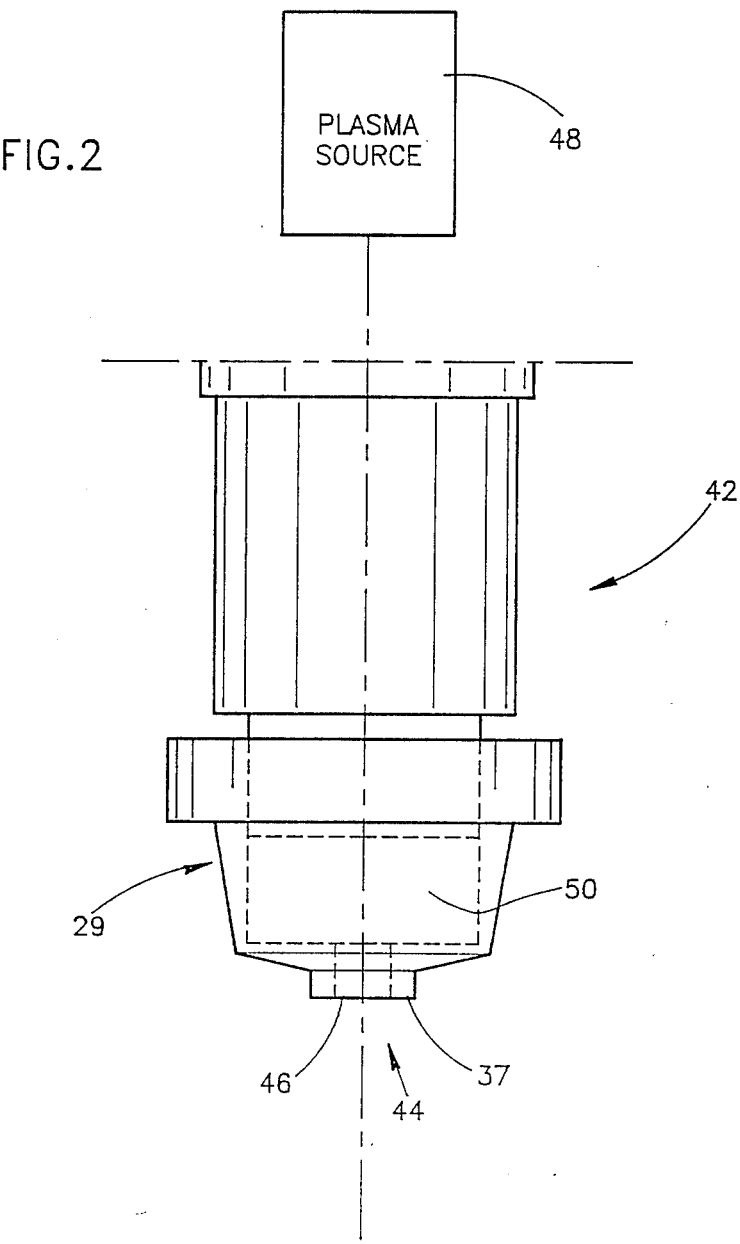
FIG. 2 is schematic side view illustration of a non-contact cutting head according to a further embodiment of the invention.

Reference is now made to FIG. 2, which shows a non-contact cutting head, referenced generally 42, constructed according to yet a further embodiment of the invention. Cutting head 42 defines a cutting tip 44 defining an aperture 46, arranged to permit passage of a plasma beam therethrough, as supplied from a plasma source, indicated schematically at 48. Typical systems utilizing plasma energy are plasma and microplasma cutting machines such as manufactured by Airco Welding Products, a division of Airco Inc., P.O. Box 486, Union, N.J. 07083, U.S.A.. A proximity sensor 50 is also shown, typically being similar to proximity sensor 28 as shown and described above in conjunction with FIG. 1B.

The cutting head also includes electromagnetic apparatus, referenced generally 29, for permitting removal of a slug from the work area. The magnetic apparatus is similar to that shown and described above in conjunction with FIGS. 1A and 1B, is not, therefore, described herein in detail.

Reference is now made to FIG. 3, in which there is shown a non-contact cutting method according to yet a further embodiment of the invention and employing, for exemplary purposes, the cutting head 12 shown and described above in conjunction with FIGS. 1A and 1B.

An initial stage of the method comprises the step of moving cutting head 12 towards a work piece 50, which is made of a material, for example, a metal, that is attractable by a magnetic force. The proximity sensor (FIG. 1B) is activated so as to ensure that a predetermined spacing between the cutting tip 24 and the work piece is maintained, as known in the art. At a selected stage prior to termination of the cutting of an aperture in the work piece, thereby forming a slug, the electromagnetic apparatus 29 is activated, so as to cause the slug to become magnetically attached to the magnetic tip 33, and thus to prevent it from falling into the work area. A slug is shown in stage 'C' in FIG. 3 by reference numeral 52.

The cutting head 12 is moved by apparatus 16 (FIG. 1A) to a selected location, as shown at stage 'D', whereat the current to the electromagnet 29 is switched off so as to permit the slug, under its own weight, to fall into, for example, a collection bin 54, or the like. The cutting head is then available for a further cutting operation.

It will be appreciated by persons skilled in the art, the present invention is not limited to the above-described laser and plasma cutting apparatus, nor to a specific cutting head. It is intended that the use of the above-described electromagnetic apparatus in conjunction with a cutting head be applicable to any cutting head using a non-contact cutting method which requires use of a proximity sensor.

It will also be appreciated by persons skilled in the art that, the scope of the present invention is not limited to what has been shown and described hereinabove by way of example. The scope of the present invention is limited, rather, solely by the claims, which follow.

I claim:

1. A cutting head for use in a non-contact process of cutting a work piece that is attractable by a magnetic force, said cutting head comprising:
   a cutting tip;
   means for sensing proximity of a work piece to said cutting tip; and
   selectably operable magnetic means for attracting a slug formed from the work piece, said magnetic means being arranged within said cutting head so as not to interfere with the operation of said means for sensing.

2. A cutting head according to claim 1, and wherein said selectably operable magnetic means comprises:
   a magnetizable portion arranged adjacent to said cutting tip; and
   selectably operable electromagnetic means operative to magnetize said magnetizable portion and being arranged within said cutting head so as not to interfere with the operation of said means for sensing.

3. A cutting head according to claim 2, and wherein said means for sensing is arranged adjacent to said cutting tip and said magnetizable portion is arranged so as to partially enclose said cutting tip and said means for sensing and so as to define a magnetizable tip adjacent to said cutting tip, said electromagnetic means comprising a coil arranged so as not to substantially surround said means from sensing.

4. A cutting head according to claim 3, and wherein said means for sensing is a capacitance sensor.

5. A cutting head according to claim 1, and wherein said cutting tip defines an aperture arranged along an axis, said aperture permitting passage therethrough of a beam of energy directed at the work piece so as to cut it and thereby form a slug.

6. A cutting head according to claim 2, and wherein said magnetizable portion is made of a low carbon ferromagnetic material.

7. A cutting head according to claim 6, and wherein said ferromagnetic material has a carbon content of no more than approximately 1%.

8. Apparatus according to claim 3, and also including an aluminum cover member mounted onto said magnetizable tip so as to prevent touching contact between said magnetizable tip and a slug.

9. Non-contact cutting apparatus for use in a non-contact process of cutting a work piece that is attractable by a magnetic force, said non-contact cutting apparatus including a cutting head which comprises:
   a cutting tip;
   means for sensing proximity of a work piece to said cutting tip; and
   selectably operable magnetic means for attracting a slug formed from the work piece, said magnetic means being arranged within said cutting head so as not to interfere with the operation of said means for sensing.

10. Apparatus according to claim 9, and wherein said selectably operable magnetic means comprises:
    a magnetizable portion arranged adjacent to said cutting tip; and
    selectably operable electromagnetic means operative to magnetize said magnetizable portion and being arranged within said cutting head so as not to interfere with the operation of said means for sensing.

11. Apparatus according to claim 10, and wherein said means for sensing is arranged adjacent to said cutting tip and said magnetizable portion is arranged so as to partially enclose said cutting tip and said means for sensing and so as to define a magnetizable tip adjacent to said cutting tip, said electromagnetic means comprising a coil arranged so as not to substantially surround said means from sensing.

12. Apparatus according to claim 11, and wherein said means for sensing is a capacitance sensor.

13. Apparatus according to claim 9, and wherein said cutting tip defines an aperture arranged along an axis and said non-contact cutting apparatus also includes means for directing a beam of energy along said axis and through said aperture so as to cut the work piece and thereby form a slug.

14. Apparatus according to claim 13, and wherein said means for directing a beam of energy comprises means for directing a beam of laser energy.

15. Apparatus according to claim 13, and wherein said means for directing a beam of energy comprises means for directing a plasma beam.

16. Apparatus according to claim 10, and wherein said magnetizable portion is made of a low carbon ferromagnetic material.

17. Apparatus according to claim 16, and wherein said ferromagnetic material has a carbon content of no more than approximately 1%.

18. Apparatus according to claim 11, and also including an aluminum cover member mounted onto said magnetizable tip so as to prevent touching contact between said magnetizable tip and a slug.

19. A non-contact cutting method comprising the following steps:
    moving a non-contact cutting head towards a work piece that is attractable by a magnetic force;
    sensing the proximity of the work piece to said cutting head;
    directing, via said cutting head, a beam of energy at the work piece so as to cut through the work piece so as to form an aperture therein and thereby form a slug;
    generating a magnetic field in the vicinity of said cutting head so as to attract the slug thereto;
    moving said cutting head to a slug release location; and
    removing said magnetic field so as to release the slug from said cutting head.

20. A method according to claim 18, and wherein said step of generating a magnetic field comprises the step of generating said magnetic field so as not to interfere with said step of sensing.

21. A method according to claim 18, and wherein said step of generating a magnetic field comprises the step of generating said magnetic field electromagnetically.

22. A method according to claim 18, and wherein said step of directing a beam of energy at the work piece comprises the step of directing a laser beam at the work piece.

23. A method according to claim 18, and wherein said step of directing a beam of energy at the work piece comprises the step of directing a plasma beam at the work piece.

* * * * *